United States Patent
Lesner et al.

(10) Patent No.: US 10,970,414 B1
(45) Date of Patent: Apr. 6, 2021

(54) AUTOMATIC DETECTION AND PROTECTION OF PERSONALLY IDENTIFIABLE INFORMATION

(71) Applicant: INTUIT INC., Mountain View, CA (US)

(72) Inventors: Christopher Z. Lesner, Mountain View, CA (US); Alexander S. Ran, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 337 days.

(21) Appl. No.: 16/111,133

(22) Filed: Aug. 23, 2018

(51) Int. Cl.
*G06F 21/62* (2013.01)
*G06F 21/60* (2013.01)
*G06F 16/25* (2019.01)
*G06F 16/2457* (2019.01)
*G06F 40/242* (2020.01)
*G06F 40/284* (2020.01)

(52) U.S. Cl.
CPC ...... *G06F 21/6245* (2013.01); *G06F 16/2457* (2019.01); *G06F 16/254* (2019.01); *G06F 21/602* (2013.01); *G06F 40/242* (2020.01); *G06F 40/284* (2020.01)

(58) Field of Classification Search
CPC .. G06F 21/6245; G06F 21/602; G06F 40/242; G06F 40/284; G06F 16/2457; G06F 16/254
See application file for complete search history.

(56) References Cited

U.S. PATENT DOCUMENTS

| | | | | |
|---|---|---|---|---|
| 9,330,174 | B1 * | 5/2016 | Zhang | G06F 16/95 |
| 9,461,972 | B1 * | 10/2016 | Mehta | H04L 63/10 |
| 2010/0023514 | A1 * | 1/2010 | Parikh | G06F 40/242 |
| | | | | 707/E17.001 |
| 2019/0197152 | A1 * | 6/2019 | Kempf | G06F 16/24578 |

* cited by examiner

*Primary Examiner* — Nelson S. Giddins
(74) *Attorney, Agent, or Firm* — Patterson + Sheridan LLP (57) ABSTRACT

Certain aspects of the present disclosure provide techniques for detecting and protecting personally identifiable information. In one example, a method includes retrieving a user-specific dataset from a multi-user dataset; filtering the user-specific dataset to create a user-specific data subset; determining a user frequency of each user-specific token of a plurality of user-specific tokens in the user-specific data subset; determining a multi-user frequency for each user-specific token of the plurality of user-specific tokens in the multi-user dataset; computing a frequency ratio based on the user-specific frequency and the multi-user frequency of each user-specific token of the plurality of user-specific tokens; and protecting each user-specific token whose frequency ratio is above a frequency ratio threshold.

20 Claims, 4 Drawing Sheets

AUTOMATIC DETECTION AND PROTECTION OF PERSONALLY IDENTIFIABLE INFORMATION

INTRODUCTION

Aspects of the present disclosure relate to automatic detection and protection of personally identifiable information.

Modern software systems accumulate and centralize massive collections of data records, often numbering in the millions or billions of records. As these "big data" collections grow in number and scope, they become increasingly useful for a variety of tasks. For example, the big data collections become the raw material for machine learning models, which create the next generation of big data-based services. Unfortunately, as big data collections increase in value, they likewise become appealing targets for hackers or even nefarious individuals with otherwise legitimate access to such data. Consequently, while invaluable and irreplaceable to organizations, such big data collections are nevertheless a significant liability to their steward organizations.

Much of the liability surrounding big data collections is due to the fact that such collections often contain "personally identifiable information" ("PII"), sometimes alternatively referred to as "personal data", "personal information", or "sensitive personal information" ("SPI"). Generally speaking, PII is information that relates to an identified or identifiable individual, which can be used on its own or with other information to identify, contact, or locate a single person, or to identify an individual in context. In some cases, different pieces of information, which collected together can lead to the identification of a particular person, also constitute PII. PII includes things such as: a name and surname; a home address; an email address; an identification card number; location data (for example the location data function on a mobile phone); an Internet Protocol (IP) address; a cookie ID; an advertising identifier of a phone; data held by a hospital or doctor, which could be a symbol that uniquely identifies a person; a date of birth, a national or tax identification number, a phone number, a home address, a user ID, an email address, a vehicle license plate number, a credit card number, and others. National identification numbers, which may include things like a social security number (SSN), driver's license number, social insurance number (SIN), tax file number (TFN), and others, are particularly valuable to thieves as they may be critical components for identity theft and illicit access to financial accounts.

Protecting big data collections while still making them broadly available to organizations, for example to build new services based on such collections, has proven challenging for a variety of reasons. As a starting point, encrypting the entirety of each data collection may be effective at protecting PII, but it renders the data collection much harder to use for other legitimate uses. Targeted encryption of known sensitive data fields is likewise an ineffective solution because while big data collections often have strictly defined and complied with data schemas, which makes it easier to encrypt, mask or remove specific fields in data records that contain PII, those same big data collections frequently have free form text fields (such as "description", "comments" or "notes" fields) into which users may save items of PII. Research has shown time and time again that despite instructions to the contrary, users of the software and services built on big data collections can and will input PII into any data field that allows it. This unfortunate propensity cannot be easily prevented because, for example, it is cumbersome to validate every bit of information a user may want to include as part of a record (e.g., a customer record or purchase invoice) associated with a software product or a service. Indeed, in many software applications, unvalidated free form text fields are necessary and thus unavoidable. The aforementioned challenges are even more acute in big data collections that do not have well-defined data schemas. Examples of such data collections include financial transaction descriptions (as downloaded from financial institutions), email or SMS messages, and voice mail messages.

PII "recognizers" have been used to try and locate inappropriate PII in data records to prevent its unwitting exposure. Such PII recognizers may combine dictionaries and regular expressions to identify PII strings that come from well-known domains or follow well-known formats, such as social security numbers, driver's license numbers, passport numbers, etc., but such recognizers still suffer from many functional shortcomings due to the inherent challenges of the problem.

One challenge is that to determine whether a recognized string is PII may require context. For example, even when a data string is recognized by a regular expression matcher, without additional context it can be hard to know to whom the PII relates i.e., is it related to the user of the software or service, or is it related to a family member or relative, etc. If the information pertains to someone other than the user, then it is not technically PII for that user (though it may still be desirable to protect).

Another challenge is that many PII strings do not have well-defined domains or formats. For example, it is very difficult to configure an algorithm to recognize if a given string represents a person's name. And even if the domain or format is well-known, errors such as spelling, truncation, string merges, and other such perturbations can defeat PII recognizers that rely on dictionaries and patterns (e.g., via regular expressions).

Yet another challenge is that not everything that looks like it may be PII is in fact PII. For example, whereas a home address is PII, a business address may not be. Similarly, a home or personal cell phone number or email address may be considered PII, while a business phone number and email address may not be considered PII. As another example, a social security number is PII, but an employer identification number (EIN) (which can be indistinguishable) is usually not PII. As yet another example, an individual's name (e.g., "John Smith") may be considered PII, unless it is also part of a business name (e.g., "John Smith Plumbing Services"). Further examples abound.

Accordingly, improved methods and systems are needed for detection and protection of personally identifiable information in data collections.

BRIEF SUMMARY

Certain embodiments provide a method for detecting personally identifiable information, including: retrieving a user-specific dataset from a multi-user dataset; filtering the user-specific dataset to create a user-specific data subset; determining a user frequency of each user-specific token of a plurality of user-specific tokens in the user-specific data subset; determining a multi-user frequency for each user-specific token of the plurality of user-specific tokens in the multi-user dataset; computing a frequency ratio based on the user-specific frequency and the multi-user frequency of each user-specific token of the plurality of user-specific tokens; and protecting each user-specific token whose frequency ratio is above a frequency ratio threshold.

Other embodiments provide systems configured to perform methods for detecting personally identifiable information, such as the aforementioned method, as well as non-transitory computer-readable mediums comprising instructions that, when executed by a processor of a processing system, cause the processing system to perform methods for detecting personally identifiable information.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for detection and protection of personally identifiable information ("PII") in data collections.

One method of for identifying PII without relying solely on conventional means, such as dictionaries and regular expressions, is to perform a statistical analysis of data in fields of records in a data collection (alternatively, "dataset") to identify predicted PII. Thereafter, the predicted PII may be protected by encryption, masking, removal, and other techniques.

Statistical PII detection methods rely on the theory that information related to a specific individual will occur more frequently in a dataset related to that specific individual as compared to a dataset related to many individuals. For example, a person's name may occur in one out of every five documents in a folder on that person's computer as compared to one out of every fifty documents in a shared drive storing documents related to many people. Beneficially, this same theory can be applied without knowing in advance the type of PII that may show up in any given dataset. Thus, statistical PII detection methods may be based on identifying any sort of data element, such as strings, words, portions of words, phrases, text, tokens, and others, which occur with higher frequency in a user-specific dataset as compared to a multi-user dataset that includes the user-specific data. This disparity in frequencies (e.g., number of occurrences per number of data items), may indicate a high likelihood that the strings are PII.

Similarly, statistical PII detection methods may identify sets of data elements whose frequency of co-occurrence within a user-specific dataset is significantly higher than the frequency co-occurrence of those set of data elements in a multi-user dataset that includes the user-specific data. For example, if the rate of co-occurrence of strings "John Smith" and "123-45-6789" in a dataset associated with "John Smith" may be significantly higher than the rate of co-occurrence of "John Smith" and "123-45-6789" in a dataset including records for many users, including John Smith. This disparity in frequencies may form the basis of a prediction that "John Smith" and "123-45-6789" are PII. This prediction can be used to proactively protect such information.

The use of statistical PII detection methods also enables the analysis to be language agnostic, unlike conventional methods, because conventional methods tend to rely on language-specific patterns and dictionaries. Especially where data collections span languages, countries, etc., the flexibility of the statistical PII detection methods far exceeds the capabilities of conventional methods.

Additionally, statistical PII detection methods can leverage the "bigness" of data collections to perform machine learning techniques, which may further improve the accuracy of or extend the capabilities of PII detection systems.

Finally, statistical PII detection methods can run alongside and complement conventional PII recognizers (e.g., those relying on dictionaries and regular expressions). For example, detections of PII by way of statistical methods may form the basis for new PII match patterns.

Example Statistical PII Detection System

Figure 1:
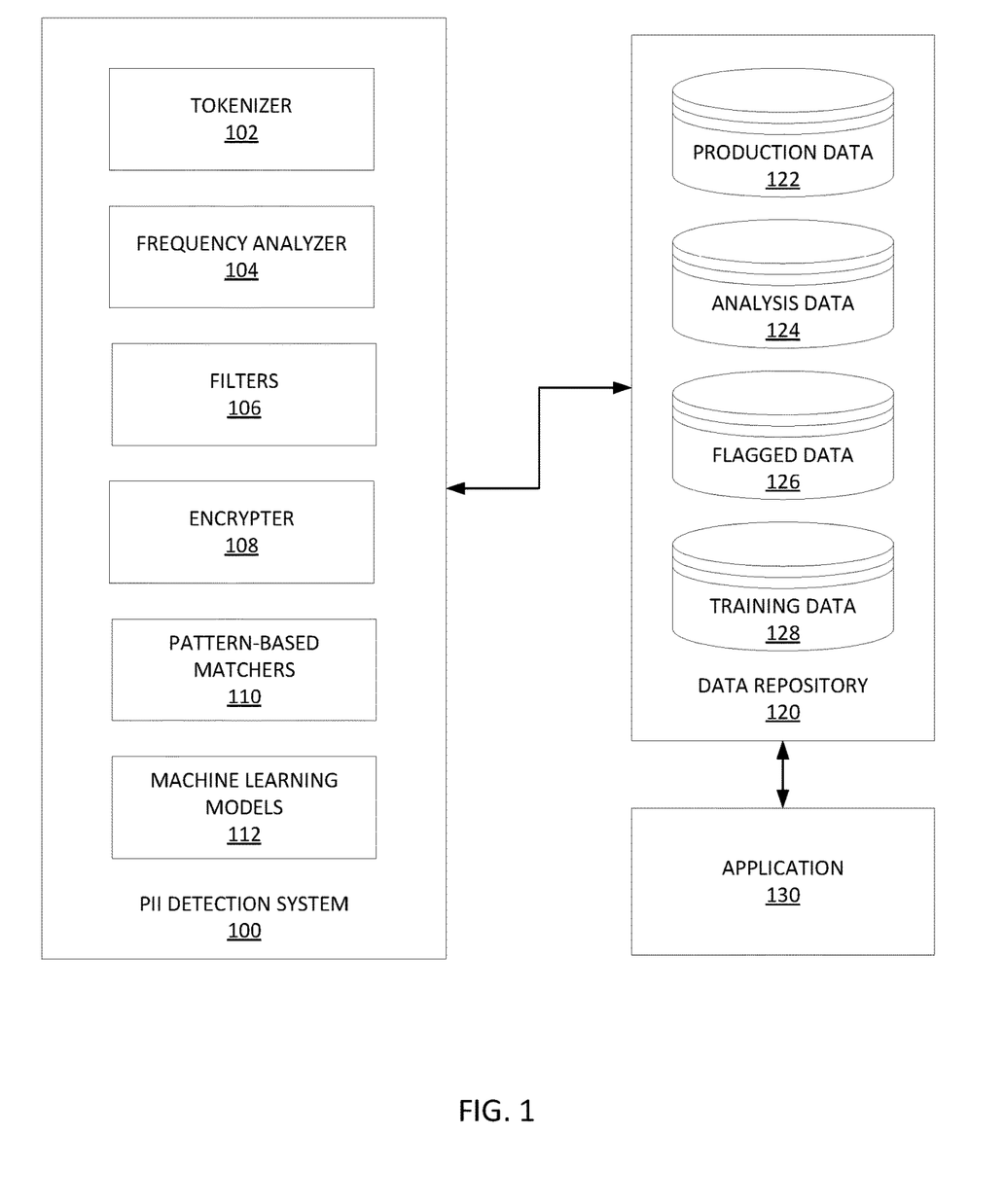
FIG. 1 depicts an example PII detection system.

FIG. 1 depicts an example statistical PII detection system 100 in data communication with a data repository 120, which is in-turn in data communication with an application 130.

PII detection system 100 includes tokenizer 102, which may create individual tokens for data elements, such as strings, specific words, portions of words, or phrases. For example, a token may be an index or randomly assigned string of characters that refers to a specific word, portion of a word, or phrase. Tokenizing provides a more efficient and secure way to matching data strings across data collections.

PII detection system 100 also includes frequency analyzer 104, which is configured to determine frequencies of, for example, words, portions of words, phrases, or tokens. For example, frequency analyzer 104 may analyze a user-specific dataset from data repository 120 to determine the frequency of each unique string, word, portions of word, phrase, or token in the user-specific dataset subset (e.g., a subset of all the data in data repository 120). Frequency analyzer 104 may perform the same operation on a data superset, such as all of the data in data repository 120, or all of the data related to a particular application, such as application 130, which is stored in data repository 120.

PII detection system 100 also includes filters 106. Filters 106 may be applied to data from data repository 120 to remove, for example, any strings, words, portions of words, phrases, or tokens that occur fewer than a threshold number of times, such as fewer than two times. These filters may be referred to as data frequency filters.

Filters 106 may also remove known insignificant strings, words, portions of words, phrases, or tokens. For example, propositions, articles, and other known non-PII text (which may be represented by a token) may be removed. In some cases, a dictionary of insignificant terms or tokens is used to filter insignificant data retrieved from data repository 120 before further analysis. These filters may be referred to as insignificant data filters.

Filters 106 may also include encrypted data filters, which filter out already encrypted data in order to prevent the encrypted data from being mistaken for PII. In fact, the underlying data may be PII, but because the encrypted data stored in the dataset is at significantly less risk for abuse (because it is already encrypted), it may not need to be flagged as potential PII by PII detection system 100.

In some cases, an encrypted data filter may be based on analyzing, for example, the contents (e.g., text) of a data field (such as may be stored in data repository 120) and determining whether or not the content conforms with statistical norms for known languages. Because languages tend to have identifiable statistical characteristics (such as the frequency of specific characters (e.g., 'a') or types of characters (e.g., vowels) or even punctuation (e.g., umlaut), encrypted text may be differentiated from non-encrypted text when it does not conform to any known language norms. This particular process is even more effective when the language of the particular data is known (e.g., English).

Filtering data from data repository 120 before further analyzing the data reduces the amount of data analyzed, which in-turn speeds up the analysis and utilizes fewer resources, such as processing cycles and memory space.

PII detection system 100 also includes encrypter 108, which may be configured to encrypt text according to any suitable encryption scheme now known or later developed. For example, encryption schemes such as Advanced Encryption Standard (AES), Data Encryption Standard (DES), Triple DES, RSA, Blowfish, Twofish, and others may be used by encrypter 108. In some cases, encrypter 108 may be used to encrypt data identified as PII by PII detection system 100 in order to protect that data.

PII detection system 100 also includes pattern-based matchers 110, which may match known patterns for PII, such as described above. For example, social security numbers, credit card numbers, passport numbers, and other known PII patterns may be determined in data repository 120 using pattern-based matchers 110. As above, pattern-based matchers 110 may be based on regular expressions and/or dictionaries.

PII detection system 100 also includes machine learning models 112. Machine learning models 112 may be created based on data stored in data repository 120. For example, unsupervised machine learning methods may be applied to analysis data collection 124. As another example, supervised learning methods may be applied to training data collection 128. In some cases, machine learning models may further predict whether specific data flagged by a statistical PII detection method is indeed PII.

Data repository 120 includes (in this example) a plurality of data collections (i.e., datasets), including production data collection 122, analysis data collection 124, and flagged data collection 126. Each data collection may be stored, for example, in a database or other functional data structure.

In this example, production data collection 122 includes data that is actively used in support of applications and services (e.g., web-based application services), such as application 130. Note that while only one application (130) is depicted in FIG. 1, many applications may be configured to interact with (e.g., stored data to and retrieve data from) production data collection 122.

Analysis data collection 124 is data that is set aside for analysis, such as by PII detection system 100. In some instances, production data collection 122 is copied to analysis data collection 124 prior to any interaction with PII detection system 100. In this way, production data collection 122 is able to actively support applications (e.g., application 130) while analysis data collection 124 is analyzed and manipulated. In some cases, production data collection 122 may be backed up to or synchronized with analysis data collection 124 at a regular interval, such as once a day or once an hour. In other cases, production data collection 122 may be backed up to or synchronized with analysis data collection 124 in a "live" manner, such as whenever data is changed in production data collection 122.

Flagged data collection 126 comprises data that has been flagged by PII detection system 100 as potential PII. The data stored in flagged data collection 126 may be reviewed by a human or subjected to additional analysis, such as by machine learning models 112, as described further below with respect to FIG. 3.

Training data collection 128 may comprise data for training machine learning models 112. For example, when PII detection system 100 detects PII that is later validated as PII, a training data instance may be created and stored in training data collection 128.

Note that while shown as a single data repository with multiple data collections in FIG. 1, each data collection could be in a different data repository, or even broken across various data repositories. Further, the separation of different types of data (e.g., production vs. analysis) into different data collections is also exemplary. In some examples, one or more of the data collections depicted in FIG. 1 could be resident in a single data collection. In such cases, the data may be separable by attributes stored in each data record.

Application 130 may be any sort of application, such as a desktop application, web-based application, mobile device application, and the like. Application 130 may use and create production data that is stored in and accessed from production data collection 122. In some examples, application 130 may be a personal finance application or a tax preparation application.

Note that while FIG. 1 does not depict any specific network or networks, one or more networks, such as local area networks (LANs), wide area networks (WANs), and the like, may connect PII detection system 100 with data repository 120, and likewise data repository 120 to application 130.

Example Statistical PII Detection Method

Figure 2:
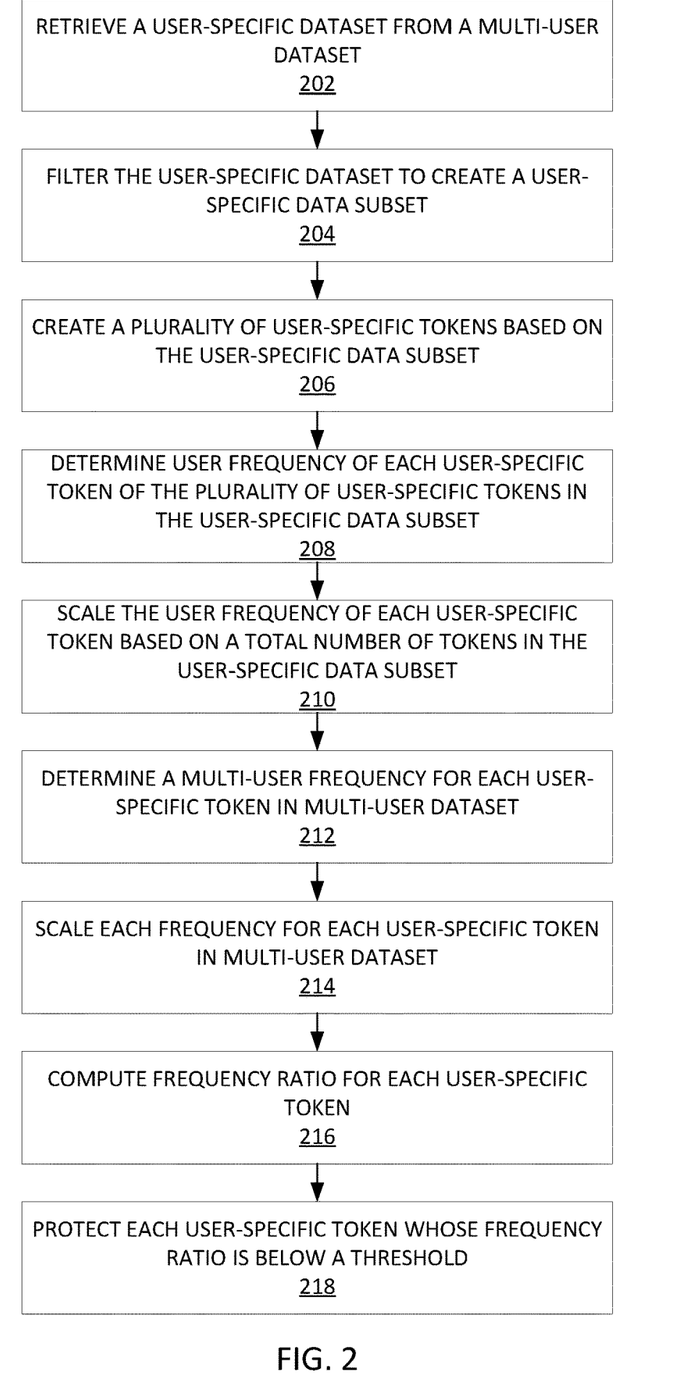
FIG. 2 depicts an exemplary method for detecting and protecting personally identifiable information.

FIG. 2 depicts an exemplary method 200 for detecting and protecting personally identifiable information.

Method 200 begins at step 202 with retrieving a user-specific dataset from a multi-user dataset. For example, the user-specific dataset could comprise application specific data related to the user stored in a data repository (such as data repository 120 in FIG. 1) that comprises data for multiple users of that application. The user-specific dataset may comprise a plurality of user records, which comprise data fields having data stored therein. As above, the data may include, for example, strings, words, portions of words, phrases, or other data element.

Method 200 then proceeds to step 204 with filtering the user-specific dataset to create a user-specific data subset. For example, the filtering may be performed by filters 106 as described with respect to FIG. 1. The filtering may be designed to reduce the amount of data to be analyzed based on data known to not be (or assumed to not be) personally identifiable information.

In one example, filtering the user-specific dataset includes removing each string, word, portion of word, phrase, or other data element in the user-specific dataset whose frequency is lower than a threshold frequency. For example, the frequency threshold could be n occurrences, such that every word, portion of word, phrase, or other data element that occurs fewer than n times is not included in the user-specific data subset. In one example, n may be 2 occurrences.

In another example, filtering the user-specific dataset includes removing each user-specific word, portion of word, phrase, or other data element in the user-specific dataset that matches an entry in an insignificant data dictionary.

In yet another example, filtering the user-specific dataset includes removing encrypted data from the user-specific dataset. As described above, encrypted data may be detected, for example, based on a statistical analysis of the user-specific dataset and comparing it to statistical norms associated with one or more different languages. Where the data does not fit any known language norm, the data may be determined to be encrypted already.

In some examples, the multi-user dataset may be also be filtered. If the multi-user dataset is filtered before retrieving the user-specific dataset, then step 204 may be unnecessary. Alternatively, the multi-user dataset may be filtered later in order for other determinations to be completed.

Method 200 then proceeds to step 206 with creating a plurality of user-specific tokens based on the user-specific data subset. Each token may correspond to a specific string, word, portion of a word, phrase, or other data element. The tokenizing of the user-specific data subset may be performed by known methods. For example, the tokenizing may be performed by tokenizer 102 as described above with respect to FIG. 1.

Note that in alternative embodiments, step 206 may be omitted such that data elements are analyzed according to the rest of method 200 just as they are found in a dataset. In other words, in the alternative embodiment, a frequency of a word or phrase may be determined directly without utilizing a tokenized representation.

Method 200 then proceeds to step 208 with determining a user frequency of each user-specific token of a plurality of user-specific tokens in the user-specific data subset. The frequency of each user-specific token may be a count or number of occurrences of each user-specific token. Determining the user-specific frequency of each user-specific token may be performed by frequency analyzer 104 as described above with respect to FIG. 1.

Method 200 then proceeds to step 210 with scaling the user frequency of each user-specific token of the plurality of user-specific tokens in the user-specific data subset based on a total number of tokens in the user-specific data subset. For example, the number of occurrences of a specific token may be divided by a total number of user-specific tokens in the user-specific data subset to produce a relative frequency metric. Thus, if a user specific token occurs 10 times in a user-specific data subset that includes 100 total user-specific tokens, the scaled frequency would be 0.1; similarly, a user-specific token that occurs 100 times in a data subset that includes 1,000 total user-specific tokens would also be scaled to 0.1. Thus, scaling may create a relative frequency metric instead of an absolute frequency metric, which may be beneficial when comparing frequencies of relatively smaller datasets (such as user-specific datasets) with relatively larger datasets (such as multi-user datasets).

Method 200 then proceeds to step 212 with determining a multi-user frequency for each user-specific token of the plurality of user-specific tokens in the multi-user dataset. In other words, instead of determining a frequency for each user-specific token based on the user-specific data subset, now a multi-user frequency is calculated based on the frequency of the user-specific token across the entire multi-user dataset. Determining the multi-user frequency may be performed by frequency analyzer 104 as described above with respect to FIG. 1. In some examples, the multi-user dataset may be an application specific dataset (such as related to application 130 of FIG. 1).

Method 200 then proceeds to step 214 with scaling the multi-user frequency of each user-specific token of the plurality of user-specific tokens in the multi-user dataset based on a total number of tokens in the multi-user dataset. As above, in some examples, the multi-user dataset is filtered before determining a total number of tokens in the multi-user dataset. The results of the scaling are the same as described with respect to the user-specific data subset in that the absolute frequency metric is scaled to a relative frequency metric.

Method 200 then proceeds to step 216 with computing a frequency ratio based on the user-specific frequency and the multi-user frequency of each user-specific token of the plurality of user-specific tokens. So, for example, if a scaled user-specific frequency for a given user-specific token is 0.1 and a scaled multi-user frequency for the given user-specific token is 0.01, then a ratio of user-specific frequency to multi-user frequency for the user-specific token is 10:1.

Method 200 then proceeds to step 218 with protecting each user-specific token whose frequency ratio is above a frequency ratio threshold. For example, if the frequency ratio threshold is 5:1, then 10:1 exceeds that threshold, which suggests that the user-specific token may be PII, and thus may need protecting. Thus, detecting PII may be based on relative frequencies of tokens between a user-specific data subset and a multi-user dataset.

Referring back to FIG. 1, because an analysis dataset (e.g., analysis data collection 124 in FIG. 1) may be distinct from a production dataset (e.g., production data collection 122 in FIG. 1) and only accessible for analysis purposes, the corresponding user-specific token in the production dataset may be the data targeted for protection. In some examples, both the user-specific token in the user-specific data subset and the user-specific token in the production dataset are protected.

In some examples, protecting each user-specific token whose frequency ratio is above the frequency ratio threshold comprises encrypting the corresponding token in a production dataset different from the multi-user dataset (i.e., the dataset used for analysis). For example, the encryption may be performed by encrypter 108 as described above with respect to FIG. 1.

In other examples, protecting a user-specific token could alternatively refer to removing the data, masking the data, or otherwise protecting it from exposure. For example, the user-specific tokens may be removed from a production data collection and stored in another data collection, such as flagged data collection 126 described with respect to FIG. 1. In other words, the user-specific tokens suspected of including PII may be sequestered for further analysis. In some cases, the user-specific tokens suspected of including PII may be moved to a secured data collection, such as a completely encrypted data collection, until the presence (or absence) of PII is validated. Notably, these are just some examples of how data may be protected if it is suspected to include PII, and others are possible.

Note that while a frequency ratio is discussed in this example for determining likely PII, other comparative metrics, such as scores, could also be used. Frequency ratios are just one example.

Though not depicted in FIG. 2, method 200 may further include applying pattern-based matchers to the user-specific data subset. Any PII detected by such pattern-based matchers may likewise be protected as discussed above with respect to step 218.

Further, method 200 may include storing user-specific tokens in a flagged dataset for validation. For example, the validation may be performed by another process or by a human. Once a stored user-specific token has been validated as including PII, it may be added to pattern-based matchers and/or may be used as training data for machine learning models, as discussed further below with respect to FIG. 3.

Notably, while method 200 has been described with respect to tokens, method 200 is equally applicable to other data elements, such as strings, words, terms, portions of words, phrases, etc.

Co-Occurrence of User-Specific Terms

Method 200 may be modified to calculate co-occurrence of data elements, such as strings, words, portions of words, phrases, tokens, etc. In other words, rather than just analyzing the frequency of any given token relative to a dataset, pairs or other tuples of tokens (or the like) may be determined. For example, the co-occurrence of "John Smith" and "123-45-6789" (which may each be a user-specific token) in data records of a user-specific dataset may be compared to the co-occurrence of those terms in a multi-user dataset. With this specific example, one would expect the co-occurrence of "John Smith" and "123-45-6789" to occur much more frequently in a user-specific dataset associated with John Smith as compared to a multi-user dataset (e.g., associated with all of the users of a particular application).

Integration of PII Detection Methods

Figure 3:
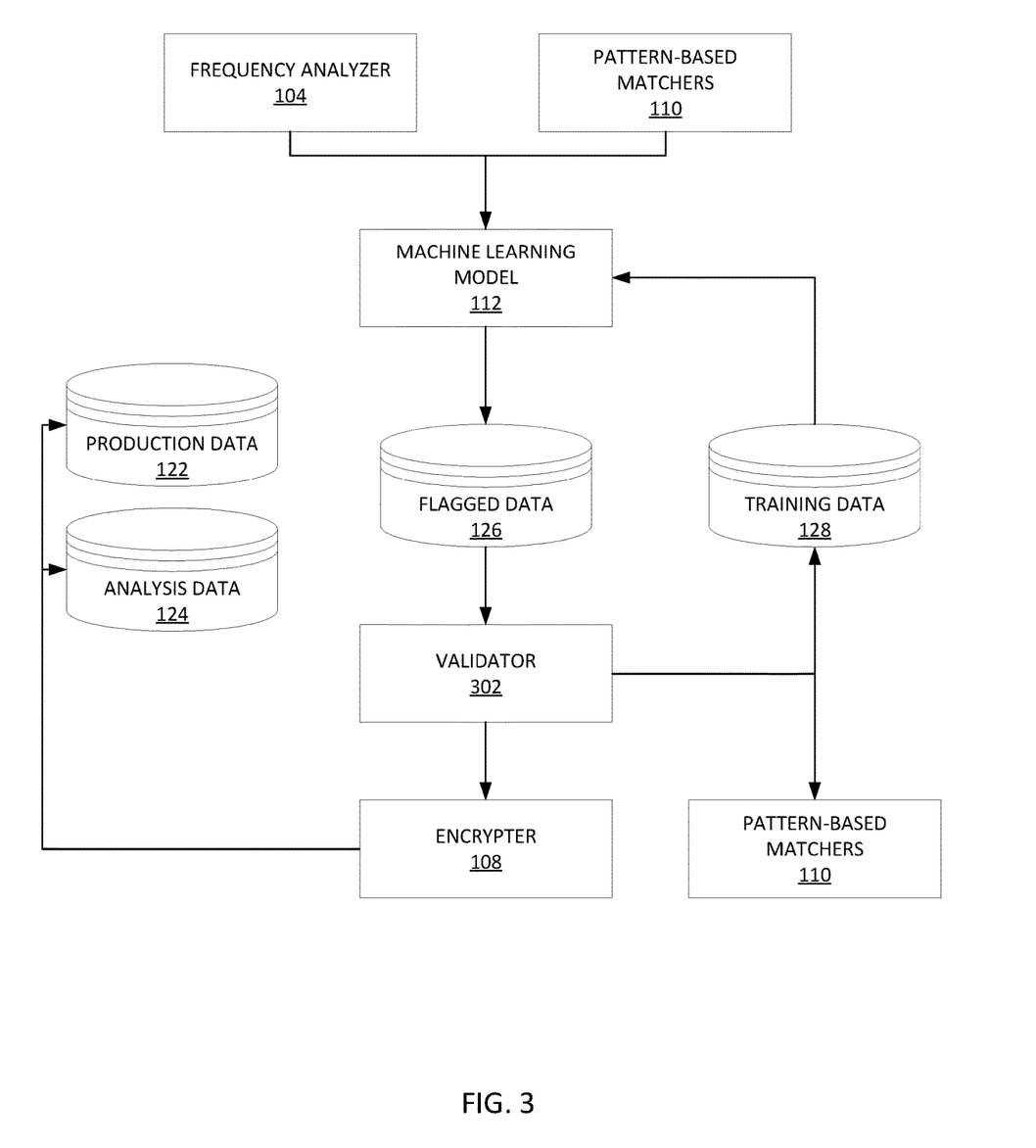
FIG. 3 depicts an exemplary method of integrating various PII detection methods.

FIG. 3 depicts an exemplary method of integrating various PII detection methods. In this example, frequency data (such as described above with respect to FIG. 2) from frequency analyzer 104 may be used as an input to machine learning model 112. Similarly, pattern-based matcher data (e.g., a "true" or "false" with respect to matching a pattern, or a similarity score comparing a token to a pattern) may also be used as input to machine learning model 112. The machine learning model may thereafter output PII likelihood data or a classification of a token (or other data element) as PII or not. The data classified as PII or exceeding a likelihood threshold, may be saved in flagged data collection 126.

Data in flagged data collection 126 may be validated by validator 302, which may be performed by another automated process or by a manual human intervention. If a token is validated as containing PII, then encrypter 108 may encrypt all occurrences of the token in analysis data collection 124, production data collection 122, or both. Alternatively, other protection mechanisms, as described above, may be employed.

Further, any token validated to contain PII may be stored in training data collection 128 to train machine learning model 112 and/or be used for the creation of additional pattern-based matchers 110.

Example Processing System

Figure 4:
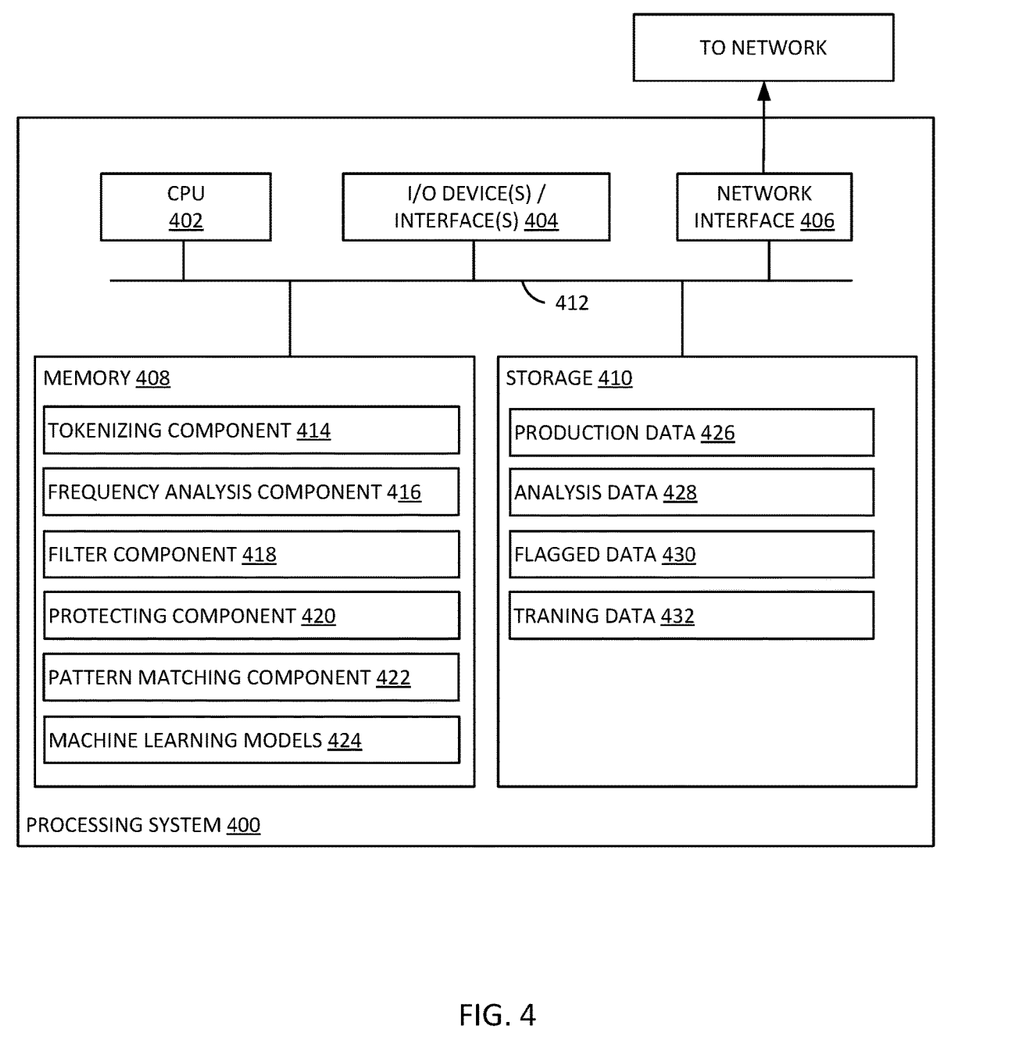
FIG. 4 depicts an exemplary processing system configured to perform a method for detecting and protecting personally identifiable information.

FIG. 4 depicts an exemplary processing system 400 configured to perform methods for detecting and protecting personally identifiable information.

Processing system 400 includes a CPU 402 connected to a data bus 412. CPU 402 is configured to process computer-executable instructions, e.g., stored in memory 408 or storage 410, and to cause processing system 400 to perform methods as described herein, for example with respect to FIGS. 2 and 3. CPU 402 is included to be representative of a single CPU, multiple CPUs, a single CPU having multiple processing cores, and other forms of processing architecture capable of executing computer-executable instructions.

Processing system 400 further includes input/output devices and interface 404, which allows processing system 400 to interface with input/output devices, such as, for example, keyboards, displays, mouse devices, pen input, and other devices that allow for interaction with processing system 400. Note that while not depicted with independent external I/O devices, processing system 400 may connect with external I/O devices through physical and wireless connections (e.g., an external display device).

Processing system 400 further includes network interface 406, which provides processing system 400 with access to external computing devices.

Processing system 400 further includes memory 408, which in this example includes tokenizing component 414, which may be like tokenizer 102 in FIG. 1. Memory 408 further includes frequency analysis component, which may be like frequency analyzer 104 in FIG. 1. Memory 408 further includes filter component 418, which may be like filters 106 in FIG. 1. Memory 408 further includes protecting component 420, which may include encrypter 108 in FIG. 1. Memory 408 further includes pattern matching component 422, which may be like pattern-based matchers 110 in FIG. 1. Memory 408 further includes machine learning models 424, which may be like machine learning models 112 of FIG. 1. While not depicted in FIG. 4, other aspects may be included in memory 408.

Note that while shown as a single memory 408 in FIG. 4 for simplicity, the various aspects stored in memory 408 may be stored in different physical memories, but all accessible CPU 402 via internal data connections, such as bus 412.

Processing system 400 further includes storage 410, which in this example includes production data 426, which may be like production data collection 122 described above with respect to FIG. 1. Storage 410 also includes analysis data 428, which may be like analysis data collection 124 in FIG. 1. Storage 410 also includes flagged data 430, which may be like flagged data collection 126 in FIG. 1. Storage 410 also includes training data 432, which may be like training data collection 128 in FIG. 1. While not depicted in FIG. 4, other aspects may be included in storage 410.

As with memory 408, a single storage 410 is depicted in FIG. 4 for simplicity, but the various aspects stored in storage 410 may be stored in different physical storages, but all accessible to CPU 402 via internal data connections, such as bus 412, or external connection, such as network interface 406.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting personally identifiable information, comprising:
    retrieving a user-specific dataset from a multi-user dataset;
    filtering the user-specific dataset to create a user-specific data subset;
    determining a user frequency for each user-specific token of a plurality of user-specific tokens in the user-specific data subset;
    determining a multi-user frequency for each user-specific token of the plurality of user-specific tokens in the multi-user dataset, wherein each multi-user frequency is determined based on a frequency of a respective user-specific token across the multi-user dataset;
    computing a frequency ratio, based on the user frequency for each user-specific token and the multi-user frequency for each user-specific token, for each user-specific token of the plurality of user-specific tokens; and
    protecting each user-specific token whose frequency ratio is above a frequency ratio threshold.

2. The method of claim 1, wherein protecting each user-specific token whose frequency ratio is above the frequency ratio threshold comprises encrypting each user-specific token whose frequency ratio is above the frequency ratio threshold in a production dataset different from the multi-user dataset.

3. The method of claim 1, further comprising: creating the plurality of user-specific tokens based on the user-specific data subset.

4. The method of claim 3, wherein filtering the user-specific dataset comprises: removing each user-specific token in the user-specific dataset whose user frequency is lower than a threshold frequency.

5. The method of claim 3, wherein filtering the user-specific dataset comprises: removing each user-specific token in the user-specific dataset that matches a token in an insignificant token dictionary.

6. The method of claim 3, wherein filtering the user-specific dataset comprises: removing encrypted text from the user-specific dataset.

7. The method of claim 1, further comprising:
    scaling the user frequency for each user-specific token of the plurality of user-specific tokens in the user-specific data subset based on a total number of tokens in the user-specific data subset; and
    scaling the multi-user frequency for each user-specific token of the plurality of user-specific tokens in the multi-user dataset based on a total number of tokens in the multi-user dataset.

8. A personally identifiable information detection system comprising:
    a memory comprising computer-executable instructions;
    a processor configured to execute the computer-executable instructions and cause the personally identifiable information detection system to perform a method of detecting personally identifiable information, the method comprising:
        retrieving a user-specific dataset from a multi-user dataset;
        filtering the user-specific dataset to create a user-specific data subset;
        determining a user frequency for each user-specific token of a plurality of user-specific tokens in the user-specific data subset;
        determining a multi-user frequency for each user-specific token of the plurality of user-specific tokens in the multi-user dataset, wherein each multi-user frequency is determined based on a frequency of a respective user-specific token across the multi-user dataset;
        computing a frequency ratio, based on the user frequency for each user-specific token and the multi-user frequency for each user-specific token, for each user-specific token of the plurality of user-specific tokens; and
        protecting each user-specific token whose frequency ratio is above a frequency ratio threshold.

9. The personally identifiable information detection system of claim 8, wherein protecting each user-specific token whose frequency ratio is above the frequency ratio threshold comprises encrypting each user-specific token whose frequency ratio is above the frequency ratio threshold in a production dataset different from the multi-user dataset.

10. The personally identifiable information detection system of claim 8, wherein the method further comprises: creating the plurality of user-specific tokens based on the user-specific data subset.

11. The personally identifiable information detection system of claim 10, wherein filtering the user-specific dataset comprises: removing each user-specific token in the user-specific dataset whose user frequency is lower than a threshold frequency.

12. The personally identifiable information detection system of claim 10, wherein filtering the user-specific dataset comprises: removing each user-specific token in the user-specific dataset that matches a token in an insignificant token dictionary.

13. The personally identifiable information detection system of claim 10, wherein filtering the user-specific dataset comprises: removing encrypted text from the user-specific dataset.

14. The personally identifiable information detection system of claim 8, wherein the method further comprises:
    scaling the user frequency for each user-specific token of the plurality of user-specific tokens in the user-specific data subset based on a total number of tokens in the user-specific data subset; and scaling the multi-user frequency for each user-specific token of the plurality of user-specific tokens in the multi-user dataset based on a total number of tokens in the multi-user dataset.

15. A non-transitory computer-readable medium comprising instructions that, when executed by a processor of a processing system, cause the processing system to perform a method for detecting personally identifiable information, the method comprising:
  retrieving a user-specific dataset from a multi-user dataset;
  filtering the user-specific dataset to create a user-specific data subset;
  determining a user frequency for each user-specific token of a plurality of user-specific tokens in the user-specific data subset;
  determining a multi-user frequency for each user-specific token of the plurality of user-specific tokens in the multi-user dataset, wherein each multi-user frequency is determined based on a frequency of a respective user-specific token across the multi-user dataset;
  computing a frequency ratio, based on the user frequency for each user-specific token and the multi-user frequency for each user-specific token, for each user-specific token of the plurality of user-specific tokens; and
  protecting each user-specific token whose frequency ratio is above a frequency ratio threshold.

16. The non-transitory computer-readable medium of claim 15, wherein protecting each user-specific token whose frequency ratio is above the frequency ratio threshold comprises encrypting each user-specific token whose frequency ratio is above the frequency ratio threshold in a production dataset different from the multi-user dataset.

17. The non-transitory computer-readable medium of claim 15, wherein the method further comprises: creating the plurality of user-specific tokens based on the user-specific data subset.

18. The non-transitory computer-readable medium of claim 17, wherein filtering the user-specific dataset comprises at least one of:
  removing each user-specific token in the user-specific dataset whose user frequency is lower than a threshold frequency; or
  removing each user-specific token in the user-specific dataset that matches a token in an insignificant token dictionary.

19. The non-transitory computer-readable medium of claim 17, wherein filtering the user-specific dataset comprises: removing encrypted text from the user-specific dataset.

20. The non-transitory computer-readable medium of claim 15, wherein the method further comprises:
  scaling the user frequency for each user-specific token of the plurality of user-specific tokens in the user-specific data subset based on a total number of tokens in the user-specific data subset; and
  scaling the multi-user frequency for each user-specific token of the plurality of user-specific tokens in the multi-user dataset based on a total number of tokens in the multi-user dataset.

* * * * *